(12) United States Patent
Cardona (10) Patent No.: US 9,393,895 B2
(45) Date of Patent: Jul. 19, 2016

(54) HEAVY DUTY TRACK FITTING

(71) Applicant: SURE-LOK INTERNATIONAL, LLC, Bethlehem, PA (US)

(72) Inventor: Edgardo Cardona, Ft. Lauderdale, FL (US)

(73) Assignee: SURE-LOK INTERNATIONAL, LLC, Bethlehem, PA (US)

( * ) Notice: Subject to any disclaimer, the term of this patent is extended or adjusted under 35 U.S.C. 154(b) by 0 days.

(21) Appl. No.: 14/212,633

(22) Filed: Mar. 14, 2014

(65) Prior Publication Data

US 2014/0271021 A1    Sep. 18, 2014

Related U.S. Application Data

(60) Provisional application No. 61/798,177, filed on Mar. 15, 2013.

(51) Int. Cl.
*B60P 7/08* (2006.01)
*F16B 7/18* (2006.01)
*B60N 2/015* (2006.01)

(52) U.S. Cl.
CPC ........... *B60P 7/0815* (2013.01); *B60N 2/01558* (2013.01); *F16B 7/187* (2013.01)

(58) Field of Classification Search
CPC .... B60P 7/0815; B60N 2/01558; F16B 7/187

USPC ................................ 410/104, 105, 8, 11, 116
See application file for complete search history.

(56) References Cited

U.S. PATENT DOCUMENTS

| 4,796,837 A * | 1/1989 | Dowd | |
| 7,641,426 B2 * | 1/2010 | Stubbe | 410/105 |

\* cited by examiner

*Primary Examiner* — Stephen Gordon
(74) *Attorney, Agent, or Firm* — Daniel A. Tallitsch (57) ABSTRACT

A track fitting assembly for engagement with an L-track is disclosed herein. The track fitting assembly includes an anchor with at least one, but preferably three track engaging lugs extending from each side of the anchor. The anchor includes a load beam whose cross-section is larger than the anchor portion not comprising the load beam. The top surface of the load beam rises above the top surface of the track. A stud extending upwards from the load beam, and because it sits above the track, the diameter of the stud is not limited by the narrowed portions of the L-Track or the load beam. The track fitting assembly also includes a locking mechanism comprising at least one index member on each side, wherein the index members fit between the lugs of the anchor. The locking mechanism comprises an opening for receiving one or both of the load beam and the stud. A nut secures hardware to the track fitting assembly through engagement with the stud.

19 Claims, 8 Drawing Sheets

HEAVY DUTY TRACK FITTING

CROSS-REFERENCE TO RELATED APPLICATIONS

This patent application claims priority to U.S. Provisional Patent Application No. 61/798,177 filed on Mar. 15, 2013, which is incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND OF THE INVENTIONS

1. Technical Field

The embodiments described and claimed herein relate generally to restraint devices for vehicles. More specifically, the embodiments described relate to improved track fittings that can withstand higher loads than existing fittings, for safely securing an object to a floor track in a vehicle (train, bus, van, plane, etc.).

2. Background Art

Conventionally, vehicles equipped with passenger seats, wheelchair restraints, or the like, have embedded on their floors channel-shaped tracks with slots into which one or more anchors can be inserted. For example, in wheelchair-accessible vehicles such as a bus, a track is installed onto vehicle floors and walls, and used as an anchoring point to secure standard bus seats, wheelchairs, occupant restraint systems, or securement accessories. Oftentimes, the tracks are installed lengthwise (front to back of vehicle) on the vehicle floor to create a plurality of anchoring points to attach seats. This method of installing the track is very efficient because with a one-track layout on the floor, the seats can be placed at different locations in the bus to meet customer specifications. It is common for bus operators to reconfigure seating and wheelchair configurations periodically and thus, it is important to have a fastening device that allows for quick removal and installation of seats.

One type of track that is commonly used in vehicles is the L track. Each L track has a series of spaced-apart circular slots between which the open upper side of the channel-shaped track narrows. Anchors are designed with lugs extending laterally from the lower part of the anchor. The lugs fit through the slots in the track, and the anchor is moved such that the lugs lie underneath the narrowed portions of the upper side of the channel-shaped track to prevent removal of the anchor from the track. Such devices also include a locking mechanism to lock the lugs underneath the narrowed portions of the track.

Current systems on the market that aim for quick removal and installation of seats onto the track are the commonly-used single and double stud fittings. In buses equipped with L track, these single and double stud fittings are designed to be bolted to the track for semi-permanent installation and have been moderately successful for attachment of seats while retaining a low profile as to size and numerosity of parts. However, due to changes in the industry and upcoming new regulations, these studs may not have sufficient strength to secure the seat to the vehicle floor tracks. The single and double stud fittings have small surface areas when installed into the L track, increasing stress concentration, which reduces the pull-out force of the fitting from the track. For example, school buses can incorporate seat belts which are attached to the attached seat frame rather than the vehicle frame. The added mass of the seated occupants will induce higher loads to the seat frame, which in turn will be transmitted to the stud fitting via the seat legs, and the load further intensified in the event of sudden deceleration. Further, the locking mechanisms of the single and double stud fittings provide for only one index member on each side of the track, resulting in a device that is compact but not one that can provide sufficient shear loads necessary for high mass or force.

Existing technology is also limited by the placement of the stud. Existing fittings place the stud in a location where it must be able to fit in between the narrowing portions of the L-track. Therefore, the maximum diameter of the stud is limited by the width of the narrowing portions of the L-track. This limits the size and overall strength of the fitting.

For these reasons, a stronger stud fitting capable of withstanding these forces while retaining a low profile is needed. An added benefit of having a stronger stud fitting is that it can be used in combination with the double and single studs to be able to attach different seat leg designs as well as minimize the amount of fittings needed to meet strength requirements. The present invention is an improvement over existing technology, which places the stud such that it is located in between the narrowing portions of the L-track. This limits the size and overall strength of the fitting. The fittings embodying the present invention allow the stud to be above the narrowing portions and the stud is supported by a strong beam. This allows the stud to be wider than the narrowed portions of the L-track.

BRIEF SUMMARY OF THE INVENTIONS

The embodiments described and claimed herein solve at least some of the problems of the prior art track fittings. One of several objects of the system described herein is to provide a track fitting that has a higher pull-out force than existing single and double stud fittings by having more lugs and better load distribution, while also retaining a low profile and minimum number of parts. The embodiments described and claimed herein utilize at least three lugs on each side of the anchor for a larger and uniform distribution of the load on the floor track and fitting. The shear strength of the fitting is further enhanced by a load beam portion of the anchor that has a larger cross-section, enabling the anchor to withstand larger pull-out forces before starting to bend under force. Even further, the locking mechanism that locks the anchor in place on the track actually locks onto the load beam of the body and not onto the stud, maximizing the shear strength of the fitting. The locking mechanism, by having at least two locking members on each side, provides for an additional safeguard against slippage of the anchor on the track.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEW OF THE DRAWINGS

These and other features, aspects, objects, and advantages of the embodiments described and claimed herein will become better understood upon consideration of the following detailed description, appended claims, and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE INVENTIONS

Figure 1:
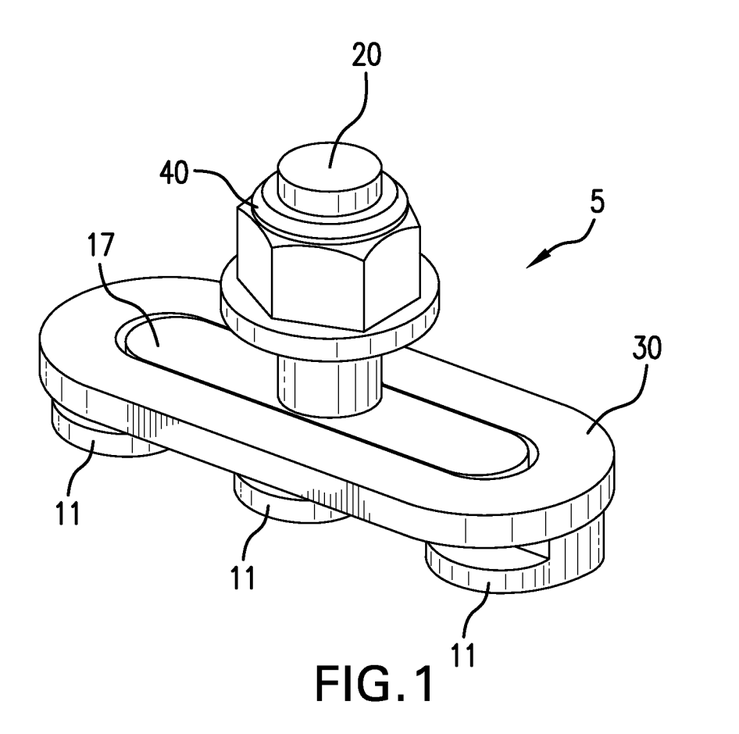
FIG. 1 is a perspective view illustrating one embodiment of the anchor, locking mechanism, and nut engaged together.
Figure 3:
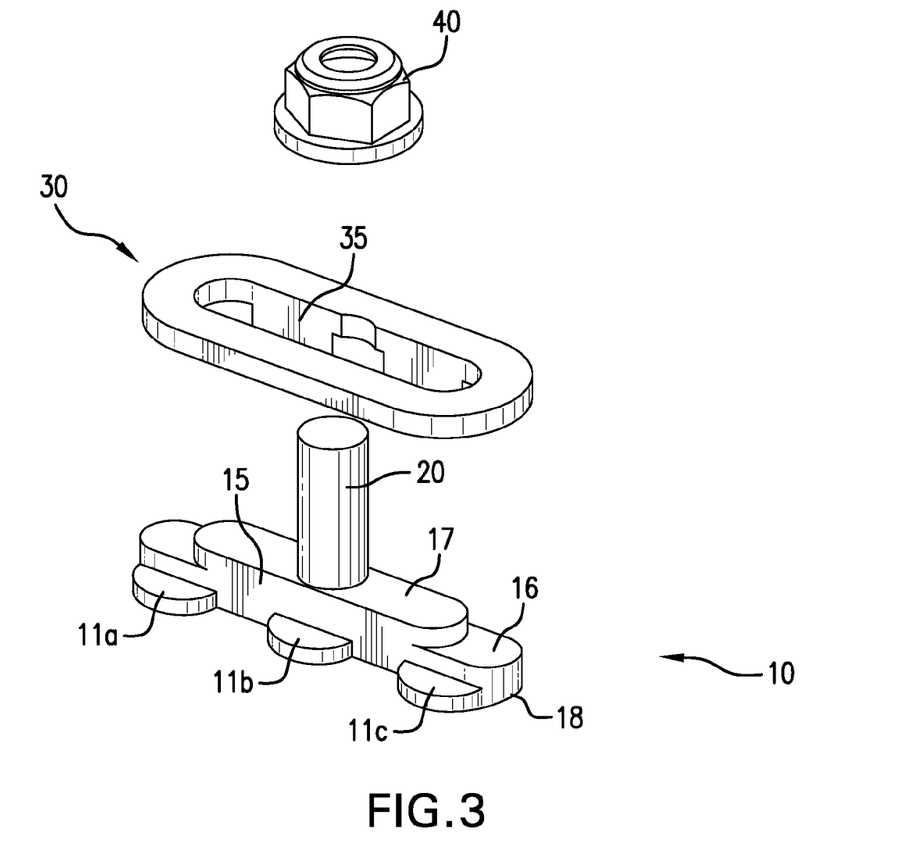
FIG. 3 is an exploded view of one embodiment comprising the anchor, locking mechanism, and nut.

Referring first to FIGS. 1 and 3, one embodiment of a track fitting assembly 5 is shown for securing passenger seats, wheelchair restraints, or the like, in a vehicle (train, bus, van, plane, etc.). This embodiment of the track fitting assembly 5 includes an anchor 10, locking mechanism 30, and nut 40.

In this particular embodiment, the anchor 10 includes three lugs 11, a load beam 15, and a stud 20. It is contemplated that the stud 20 is a 7/16-inch UNF stud, although the stud size can be varied depending on load requirements. In fact, because the base of the stud 20 is positioned on top of the load beam 15, which in turn is positioned above a top surface of the track 1, the diameter of the stud is not limited by the width of the narrowed portions 3 of the track. Indeed, the diameter of the stud 20 can exceed the width of the narrowed portions 3 of the track to increase the sheer load capacity of the fitting 5. If the diameter of the stud 20 exceeds the width of the load beam 15, filler material may be added to the load beam 15 and the stud 20 in an area around and below the stud 20 to avoid concentrating stress at a corner between the two. The width of the load beam 15 at a elevation below the top surface of the track, however, should be maintained less than the width of the narrowed portions 3 of the track 1 so as to not interfere with the ability of the fitting 5 to slide between the narrowed portions 3 of the track 1.

The locking mechanism 30 is shaped to match the contours of the anchor 10 and has an opening that mates with the periphery of the load beam 15. The locking mechanism 30 has two index members 35 on each side of the mechanism 30 to be fitted between the lugs 11 of anchor 10. The stud 20 that is to engage with the hardware 50 to be secured is disposed at the center of the load beam 15, directly above one on the lugs 11b. The opening of the locking mechanism 30 is widened at its center to permit passage of the stud 20. The stud 20 being disposed at the center of the anchor 10 helps with varied load distribution across all three lugs 11 extending from the anchor 10 to minimize any bending at the center and distribute the load across a bigger area. The nut 40 fastens the hardware 50 to be engaged with the stud 20 and would correspond in size to the stud 20. It is contemplated that the nut is also a 7/16-inch UNF nut, although the nut size can be varied depending on stud size.

It can be appreciated from FIG. 3 that one embodiment of the anchor is characterized by a height increase from the anchor base top surface 16 to the load beam top surface 17. This height increase results in a larger load beam 15 and a better distribution of load. The load beam portion 15 of the anchor 10 has a larger cross-section, enabling the anchor 10 to withstand larger pull-out forces before starting to bend under force. By virtue of the distance between the load beam bottom surface 18 and the load beam top surface 17 being greater than the distance between the load beam bottom surface 18 and the anchor base top surface 16, the moment of inertia of the anchor 10 is higher, enabling a distribution of higher load onto the anchor 10. The top surfaces 16 at each end of the load beam form seats for downwardly facing curved portions of the ends of the locking mechanism 30. The thickness of the locking mechanism 30, at locations not including the downwardly depending index members 35, is approximately equal to the height of the step from the surfaces 16 to the top of the load beam 17, i.e., the thickness of the locking mechanism is generally equal to the difference in elevation between the top surface 16 and the top of the load beam 17. This can be seen in FIG. 1, and provides a broader surface against which the nut can clamp and object to be held by the fitting assembly 5. The broader surface is comprised of the upper surface of the locking mechanism 30 and the upper surface 17 of the load beam, which are generally in horizontal alignment or generally parallel to each other, when the fitting assembly 5 is fully assembled.

Figure 4:
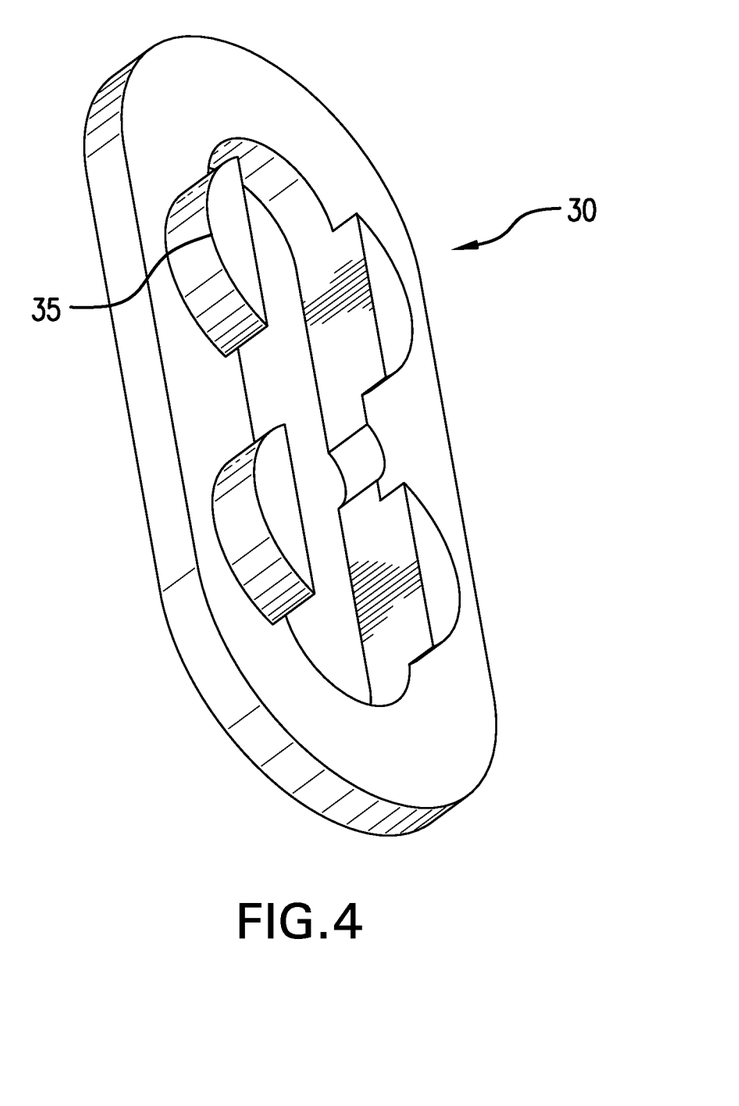
FIG. 4 is a perspective view of the underside of the one embodiment of the locking mechanism, detailing the indexing members.

Referring to FIG. 4, the underside of one embodiment of the locking mechanism 30 is shown, with emphasis on the index members 35, which would fit between the three lugs 11 of anchor 10.

Figure 5:
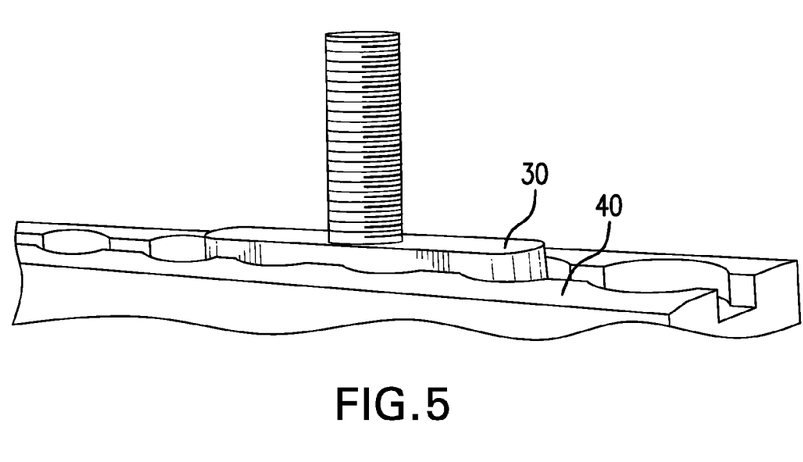
FIG. 5 is a perspective view of one embodiment of the anchor fitted onto an L track to demonstrate a height differential between the load beam top surface and track surface.

Referring to FIG. 5, one embodiment of the anchor 10 fitted onto an L track 1 is shown. It can be appreciated in this embodiment that the load beam top surface 17 is raised above the L track top surface 4, allowing the anchor 10 to accommodate a variety of larger (and smaller) stud sizes. For example, without this raised height configuration, a 3/8-inch stud would normally be used for a single or double stud fitting for an L track. However, with a raised load beam top surface 17, a 7/16-inch stud or larger can be accommodated because the stud size is not constrained by the space between the track's narrowed portions 3. A larger stud size with a increased root diameter exponentially increases shear load capacity of the stud. More shear load can be placed on this stud than can be placed on a smaller stud.

Figure 2:
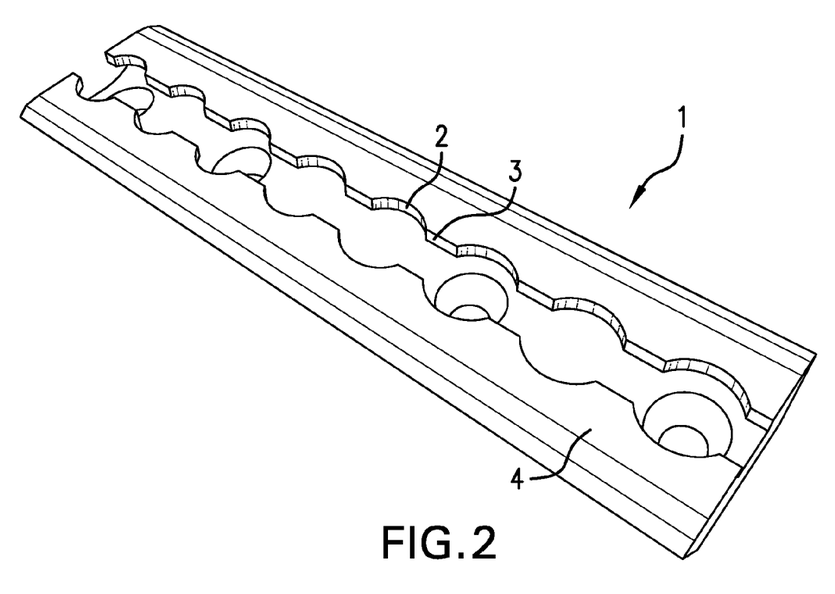
FIG. 2 is a perspective view of an L track, for which one of the embodiments is fitted.
Figure 6:
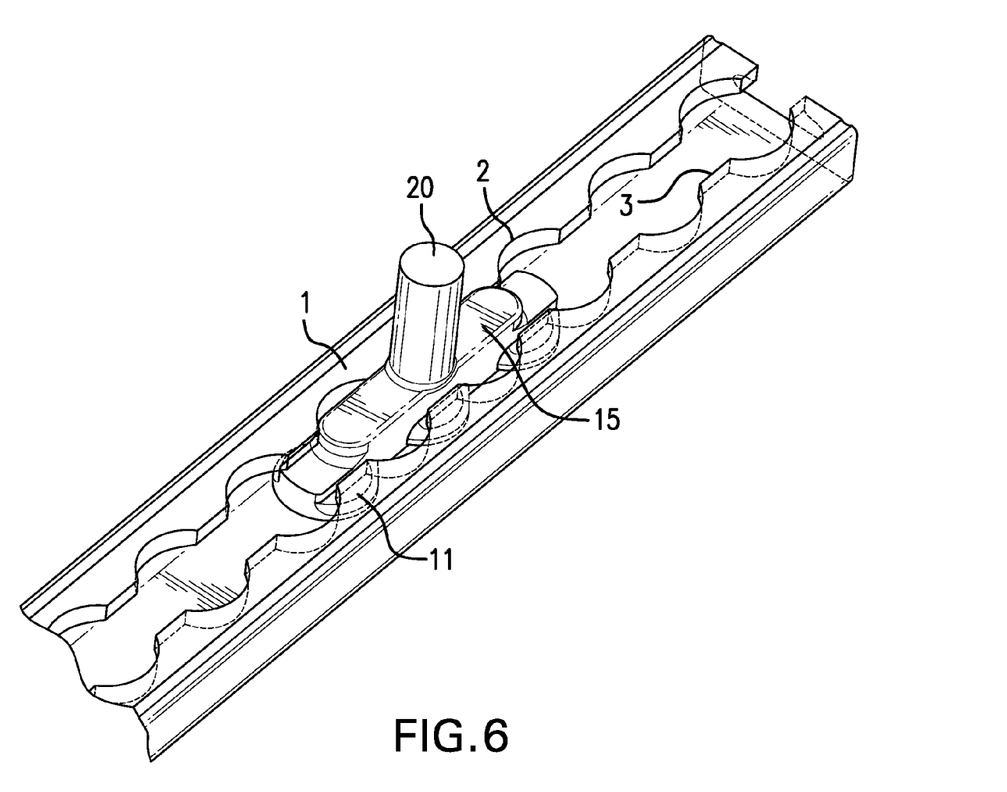
FIG. 6 is a perspective view of one embodiment of the track fitting assembly fitted onto an L track, showing the "hidden" contours of the anchor underneath the visible portion of the track.
Figure 7:
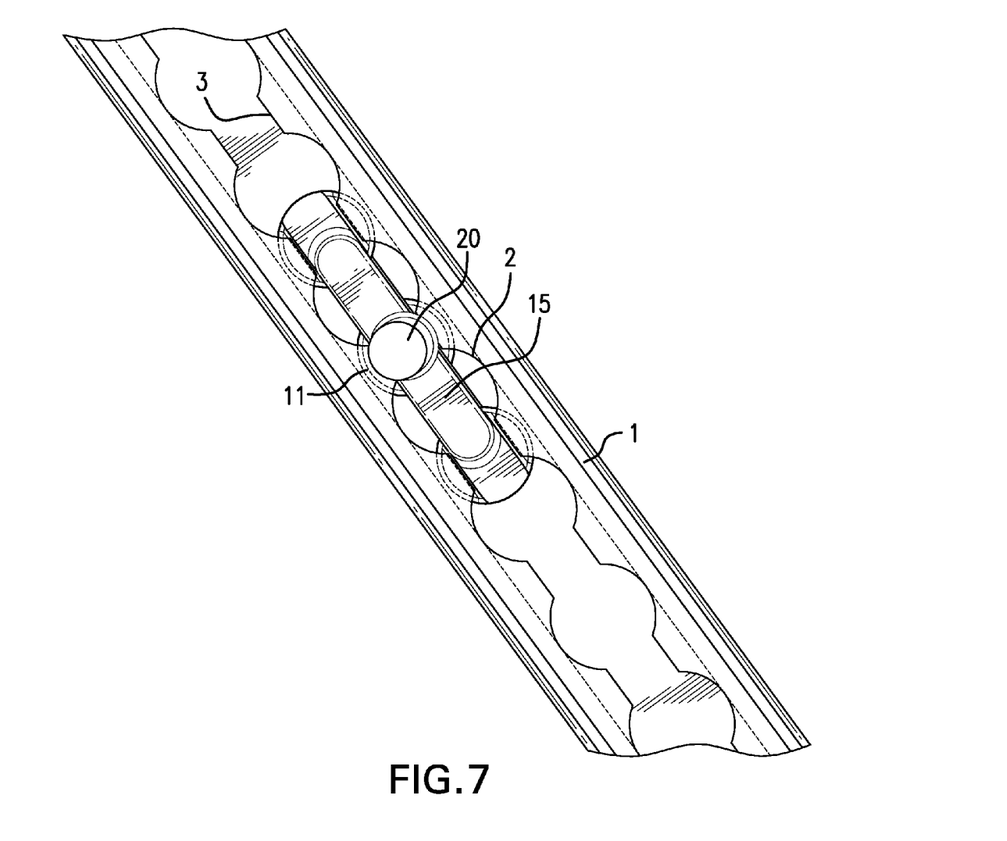
FIG. 7 is a top view of one embodiment of the track fitting assembly fitted onto an L track, showing the "hidden" contours of the anchor underneath the visible portion of the track; and, FIG. 8 is a perspective view of a piece of hardware fitted onto the track fitting assembly through an opening in the hardware.

With reference now to FIGS. 2, 6, and 7, an L track 1 is shown with a perspective view of one embodiment of the track fitting assembly 5 fitted into the L track 1. The L track 1 is comprised of a plurality of slots 2 which are interspersed with narrowed portions 3, under which the lugs 11 of the anchor 10 would be disposed and against which the load beam is disposed. In a secured configuration, the load beam is disposed adjacent to and engages with three narrowed portions 3 of the track 1, as best depicted in FIG. 7, to aid in distributing the load. To secure the track fitting assembly 5 in place on the track 1, a user would align the lugs 11 of anchor 10 into adjacent slots 2 and then slide the anchor 10 horizontally along the length of the track 1 so that the lugs 11 are in place underneath the narrowed portions 3 of the track 1. The user would then place the locking mechanism 30 upon the anchor 10 so that it rests upon the anchor base top surface 16. In this configuration, the locking mechanism 30 would also rest upon the top surface 4 of the track 1. The index members 35 would fit snugly against the surface of the slots 2 and securely lock the anchor 10 in place by confining the lugs 11 to the space underneath the narrowed portions 3 of L track 1 and ensure that the track fitting assembly 5 will not move out of proper alignment. An advantageous feature of the locking mechanism 30 is that contact is made with the load beam 15 and not with the stud 20, ensuring that the stress is minimized upon the stud 20.

The phantom lines of FIGS. 6 and 7 show the contours of the lugs 11 taking up the space underneath the narrowed portions 3. In FIG. 7, the contours of the track underneath the visible portion of the track fitting assembly are shown, but for clarity purposes, only on one side of the track.

Figure 8:
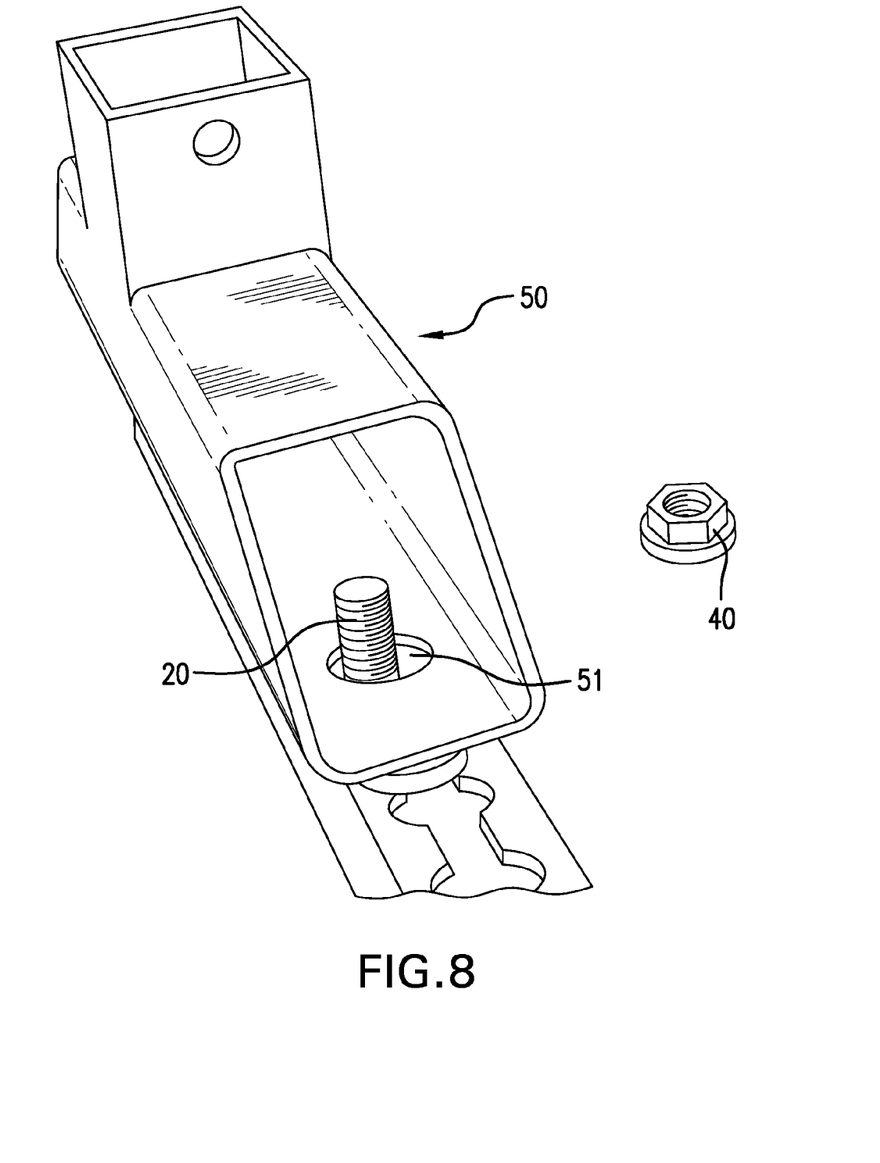

Referring to FIG. 8, to install a piece of hardware 50 to be affixed onto the track fitting assembly 5, the user would place the hardware 50 upon the assembly 5 so that the stud 20 is inserted into an opening 51 in the hardware 50. The corresponding nut 40 would then be fitted onto the stud 20 and torqued properly to complete the system.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

I claim:

1. A track fitting assembly for engagement with a track having a top surface with an opening, the track fitting assembly comprising:
    an anchor with at least one track engaging lug extending from first and second sides of the anchor;
    the anchor including a load beam with a top surface that is configured to be disposed above the top surface of the track;
    a stud extending upward from the load beam wherein the entire stud is disposed above the top surface of the track;
    a locking mechanism comprising at least one index member on first and second sides of the locking mechanism, wherein the index members fit between the lugs of the anchor;
    wherein the locking mechanism comprises an opening for receiving one or both of the load beam and the stud.

2. The track fitting assembly of claim 1, wherein the lugs of the anchor are shaped to closely fit through the openings of the track and the index members are shaped to engage and be disposed in the openings of the track, whereby the assembly is configured to fit into and be held in the track.

3. The track fitting assembly of claim 1, wherein the locking mechanism comprises of at least two index members on the first and second sides of the locking mechanism.

4. The track fitting assembly of claim 1, wherein the load beam is disposed at the center of the anchor and extends between each of the track engaging lugs.

5. The track fitting assembly of claim 1, wherein the stud extends upward from the center of the load beam above one of the at least one track engaging lugs.

6. The track fitting assembly of claim 1, wherein the stud is at least 7/16-inch in diameter.

7. A track fitting assembly for engagement with a track, the track fitting assembly comprising
    an anchor with at least one track engaging lug extending from first and second sides of the anchor;
    the anchor including a load beam with a top surface that is configured to be disposed above a top surface of the track;
    a stud extending upward from the load beam;
    a locking mechanism comprising at least one index member on first and second sides of the locking mechanism, wherein the index members fit between the lugs of the anchor;
    wherein the locking mechanism comprises an opening for receiving one or both of the load beam and the stud; and
    wherein a diameter of the stud is approximately equal to or exceeds a width of the load beam.

8. The track fitting assembly of claim 1, wherein a diameter of the stud is at least approximately equal to or exceeds a width of the load beam.

9. A track fitting assembly for engagement with a track having a top surface with an opening, the track fitting assembly comprising:
    an anchor with at least three track engaging lugs extending from first and second sides of the anchor;
    the anchor including a load beam with a top surface that is configured to be disposed above the top surface of the track;
    a stud extending upwards from the load beam wherein the entire stud is disposed above the top surface of the track;
    a locking mechanism comprising at least one index member on first and second sides of the locking mechanism, wherein the index members fit between the lugs of the anchor;
    wherein the locking mechanism comprises an opening for receiving one or both of the load beam and stud.

10. The track fitting assembly of claim 9, wherein the assembly is configured to fit into the opening of the track, and the opening of the locking mechanism is shaped to closely fit around an upwardly protruding portion of the load beam, and the index members of the locking mechanism extend downwardly from an underside of the locking mechanism and are staggered axially with respect to the lugs of the anchor, such that the lugs are offset with respect to said index members when the locking mechanism engages the load beam.

11. The track fitting assembly of claim 9, wherein the locking mechanism comprises of at least two index members on the first and second sides of the locking mechanism.

12. The track fitting assembly of claim 9, wherein the load beam is disposed at the center of the anchor and has a longitudinal axis that extends generally parallel with respect to a longitudinal axis of the anchor.

13. The track fitting assembly of claim 9, wherein the stud extends upwardly from the center of the load beam above one of the track engaging lugs.

14. The track fitting assembly of claim 9, wherein the stud is at least 7/16-inch in diameter.

15. A track fitting assembly for engagement with a track, the track fitting assembly comprising:
- an anchor with at least three track engaging lugs extending from first and second sides of the anchor;
- the anchor including a load beam with a top surface that is configured to be disposed above a top surface of the track;
- a stud extending upwards from the load beam;
- a locking mechanism comprising at least one index member on first and second sides of the locking mechanism, wherein the index members fit between the lugs of the anchor;
- wherein the locking mechanism comprises an opening for receiving one or both of the load beam and stud; and,
- wherein the load beam has a generally constant width, and the stud has a diameter that is at least approximately equal to the width of the load beam.

16. The track fitting assembly of claim 15, wherein a diameter of the stud exceeds the width of the load beam.

17. The track fitting assembly of claim 9, wherein a nut is capable of being fitted onto the stud.

18. The track fitting assembly of claim 1, wherein a diameter of the stud is approximately equal to or exceeds a width of a narrowed portion in the opening of the track.

19. The track fitting assembly of claim 9, wherein a diameter of the stud is approximately equal to or exceeds a width of a narrowed portion in the opening of the track.

* * * * *